United States Patent
Pritchard

(10) Patent No.: US 6,182,426 B1
(45) Date of Patent: Feb. 6, 2001

(54) VERTICAL FORM, FILL, SEAL MACHINE AND METHODS

(75) Inventor: Barry L. Pritchard, Nazareth, PA (US)

(73) Assignee: Liqui-Box Corporation, Worthington, OH (US)

(*) Notice: Under 35 U.S.C. 154(b), the term of this patent shall be extended for 0 days.

(21) Appl. No.: 09/174,426

(22) Filed: Oct. 19, 1998

(51) Int. Cl.[7] ................................................. B65B 9/06
(52) U.S. Cl. ............................... 53/551; 53/412; 53/451; 53/133.2
(58) Field of Search ......................... 53/410, 412, 451, 53/456, 551, 552, 133.2; 493/212, 213

(56) References Cited

U.S. PATENT DOCUMENTS

| | | |
|---|---|---|
| 3,282,020 | 11/1966 | Smith ........................................ 53/180 |
| 3,380,646 | 4/1968 | Doyen et al. ............................. 229/57 |
| 3,681,890 | 8/1972 | Pringle, Jr. et al. ..................... 53/14 |
| 3,894,381 | 7/1975 | Christine et al. ....................... 53/128 |
| 4,077,186 | 3/1978 | Voegele ................................... 53/28 |
| 4,246,062 | 1/1981 | Christine ............................... 156/498 |
| 4,297,929 | 11/1981 | Schieser et al. ....................... 83/110 |
| 4,384,440 | 5/1983 | Ohlsson ................................. 53/412 |
| 4,452,378 | 6/1984 | Christine .............................. 222/107 |
| 4,603,536 | 8/1986 | de la Poype ............................ 53/410 |
| 4,606,174 | 8/1986 | Berg ....................................... 53/451 |
| 4,695,337 | 9/1987 | Christine ............................... 156/69 |
| 4,747,253 | 5/1988 | Schulte .................................. 53/433 |
| 4,779,397 | 10/1988 | Christine et al. ...................... 53/410 |
| 4,836,691 | 6/1989 | Suzuki et al. .......................... 383/80 |
| 4,891,929 | 1/1990 | Branchi ................................. 53/451 |
| 4,924,655 | * 5/1990 | Posey .................................... 53/128 |
| 4,947,621 | 8/1990 | Christine et al. ...................... 53/451 |
| 5,129,212 | 7/1992 | Duffey et al. .......................... 53/426 |
| 5,170,609 | * 12/1992 | Bullock et al. ........................ 53/434 |
| 5,348,525 | 9/1994 | Buchanan ............................. 493/213 |
| 5,391,163 | 2/1995 | Christine et al. ..................... 604/408 |
| 5,454,208 | 10/1995 | Kawano ................................. 53/410 |
| 5,548,947 | 8/1996 | Fincham et al. ....................... 53/551 |
| 5,606,844 | 3/1997 | Takagaki et al. ...................... 53/410 |
| 5,678,732 | 10/1997 | Gianpaolo ............................ 222/107 |
| 5,768,861 | * 6/1998 | Slenders ................................ 53/551 |
| 5,822,958 | * 10/1998 | Davis ..................................... 53/551 |
| 5,826,401 | * 10/1998 | Bois ...................................... 53/412 |
| 5,832,701 | * 11/1998 | Havers et al. ......................... 53/551 |
| 5,924,268 | * 7/1999 | Fukuda et al. ........................ 53/550 |
| 5,971,905 | * 10/1999 | Fukuda ................................. 493/3 |
| 5,992,131 | * 11/1999 | Iwana et al. .......................... 53/451 |

* cited by examiner

*Primary Examiner*—Ed Tolan
(74) *Attorney, Agent, or Firm*—Vorys, Sater, Seymour and Pease LLP

(57) ABSTRACT

In a vertical form, fill, seal machine that produces liquid-filled stand-up pouches, a flat vertical fill tube is surrounded by an envelope of thermoplastic film that is closed along one longitudinal edge and open along the opposite longitudinal edge. A main drive assembly includes drive members that press opposite sides of the envelope against the flat fill tube. An auxiliary film drive assembly is responsive to film tension. Stand-up base cups are formed seriatim along the closed longitudinal edge of the envelope. Fitments are inserted seriatim into the open longitudinal edge, in correspondence with respective cups, and are sealed to the thermoplastic film, first by a spot-sealer and then by a top sealer. End seal/cut-off assemblies provide a seal transversely of the envelope that is bisected by a knife to release a leading pouch that has been formed, filled, and sealed. Prior to end sealing and cut-off, a predetermined quantity of liquid is dispensed from the bottom of the fill tube into a pouch next to the leading (just-filled) pouch. A deflater assembly evacuates and stabilizes a region of the envelope at which each end seal is formed.

16 Claims, 18 Drawing Sheets

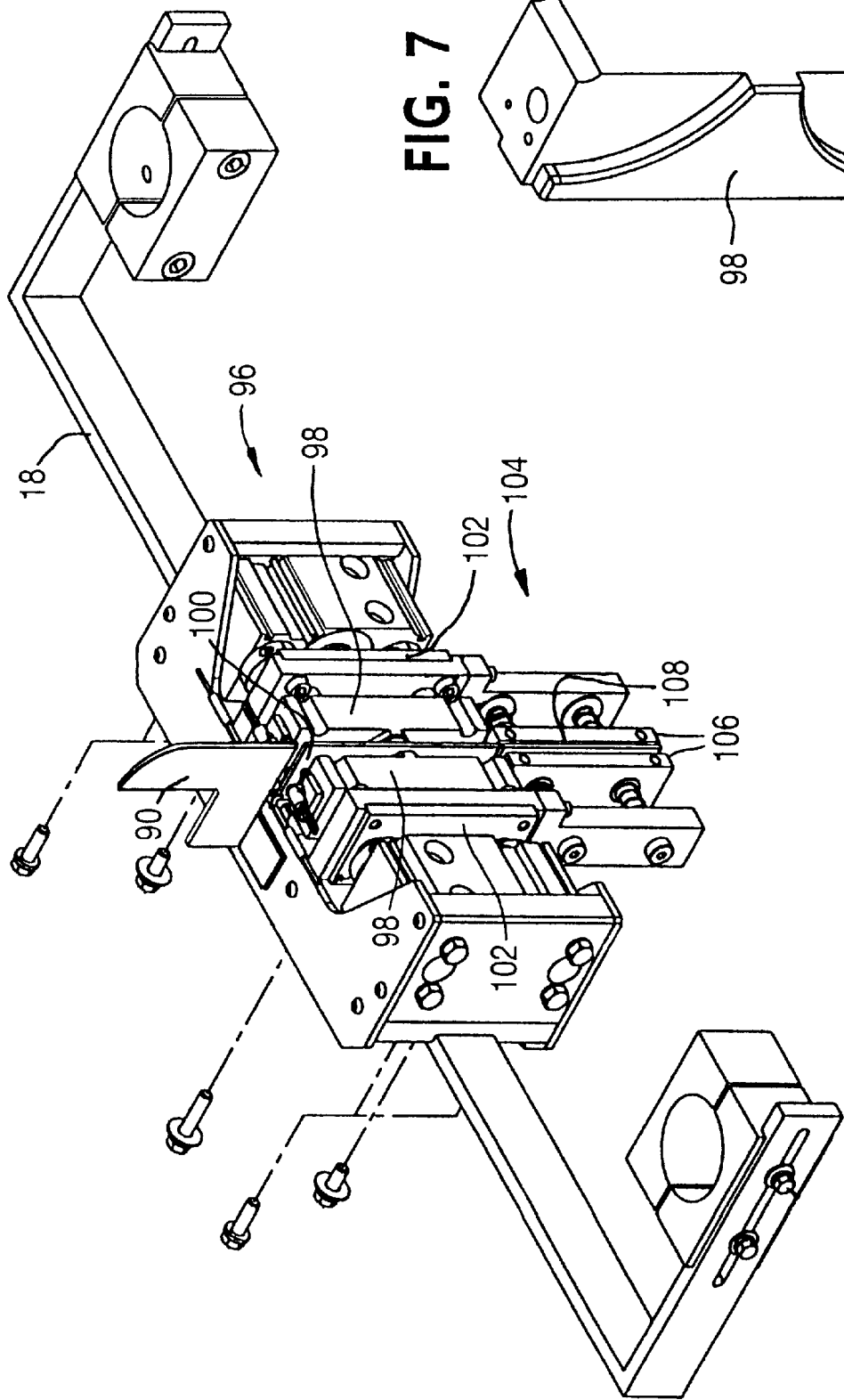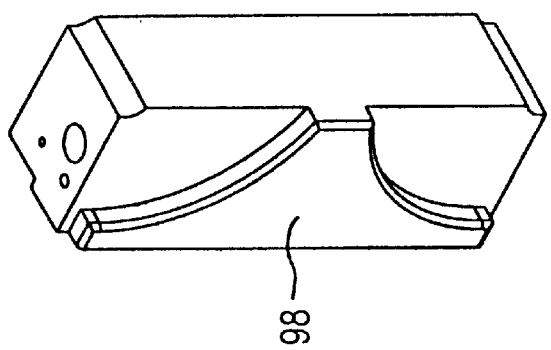

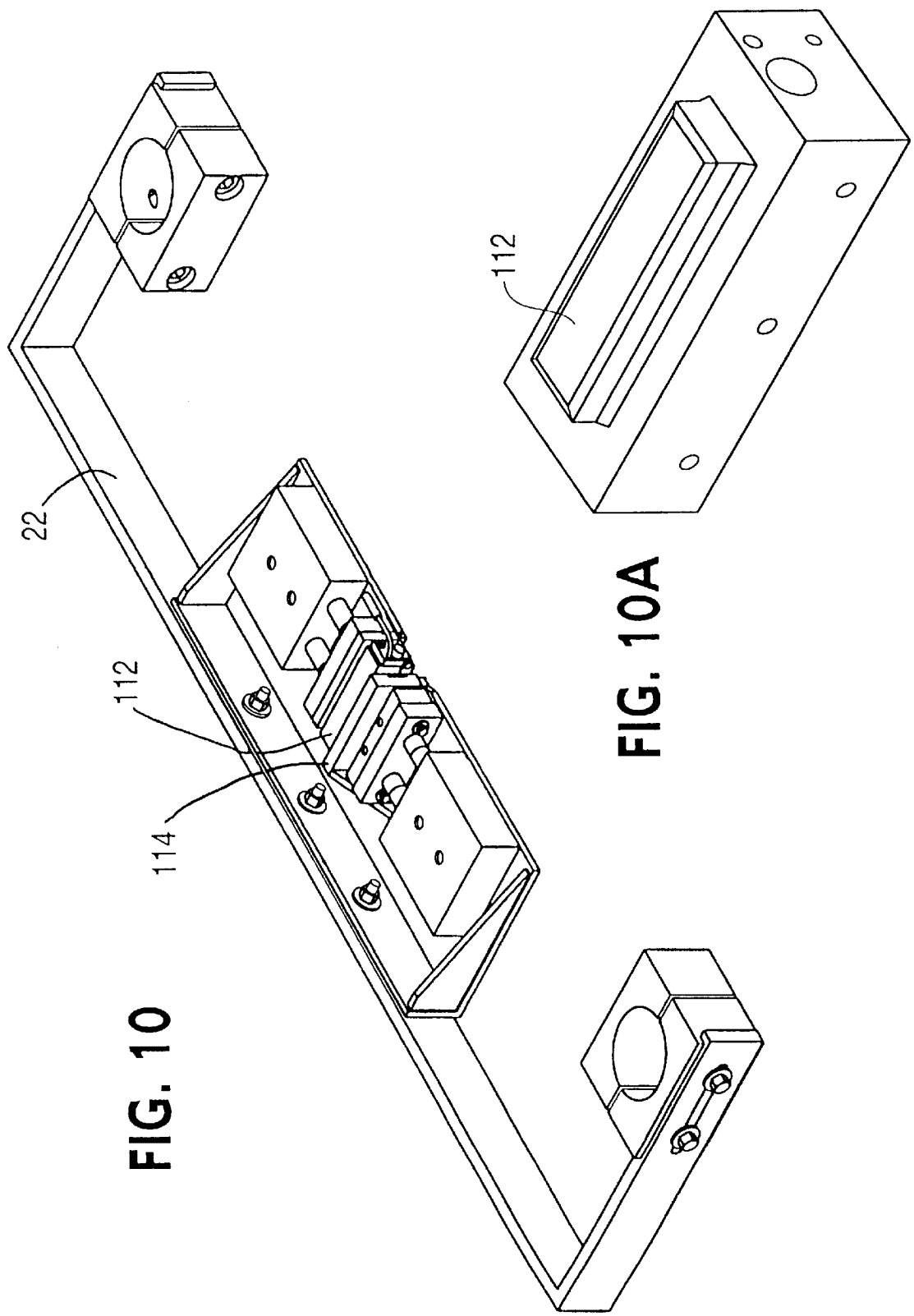

VERTICAL FORM, FILL, SEAL MACHINE AND METHODS

BACKGROUND OF THE INVENTION

This invention is concerned with the manufacture of stand-up pouches, and more particularly with the manufacture of liquid-filled stand-up (self-supporting) pouches of thermoplastic film, by a vertical form, film, seal (F/F/S) machine.

At present, horizontal F/F/S machines are used to package dry flowable products. Liquid filling of stand-up pouches, when performed on such machines, is generally limited to small volume pouch sizes. This is a reflection of the manner in which the machines operate.

In a horizontal machine, before a pouch is filled it is completely formed, with the exception of an open top. To fill the pouch, it is handed off to a set of grippers on a rotating, intermittent motion filling/sealing section. The grippers are actuated to open the top of the pouch, and a predetermined quantity of a free flowing product is funneled into the pouch. The top is then heat sealed.

Handling large volumes of liquid in pouches on a rotating, intermittent motion filling/sealing section is difficult, because of the weight of the liquid and its fluidic activity.

Horizontal machines have limitations in addition to pouch size. The step-up or pull length of the pouch is not easy to modify, since the grippers that open the top of the pouch must be set to the exact pouch width. Since a number of pouches may be open and exposed to the surrounding environment during filling, it may be necessary to provide an enclosure and filtration or over-pressurization apparatus to avoid product contamination. Furthermore, the placement of fitments and the types of pouch films that can be used tend to be limited.

Vertical machines have been used to produce liquid-filled pouches. See, e.g., commonly owned U.S. Pat. No. 4,947,621, incorporated herein by reference. However, such machines are not designed to produce stand-up pouches.

SUMMARY OF THE INVENTION

The present invention provides improved apparatus and methods for forming, filling and sealing stand-up pouches, more particularly for producing such pouches on vertical machinery in a manner that avoids the problems associated with horizontal F/F/S machines.

In the invention, pouches are part of a continuous film web until they are complete. Larger fill volumes can be accommodated, because the pouches are supported by the continuous web during filling and sealing. Cleanliness is assured, because filling takes place within the confines of the continuous web. Fitments can be applied to the pouches without impeding the filling operation. Size changes are easier to make, providing flexibility in the manufacturing operation. A wider variety of film structures can be utilized.

A preferred embodiment of a vertical F/F/S machine in accordance with the invention will now be described briefly. However, it will become apparent that various features of the invention have broader utility.

In the preferred embodiment, a flat, wide, vertical fill tube is surrounded by an elongated envelope of thermoplastic film. Initially, the envelope is closed along one longitudinal edge and is open along the opposite longitudinal edge. Drive members of a main drive assembly press the sides of the envelope against the respective sides of the fill tube and drive the envelope step-wise, each step corresponding to one pouch pitch.

A cup-former, including cup shaping, sealing and chilling apparatus, transforms a portion of the envelope along the closed edge into a series of cups, each of which will constitute a stand-up base at the bottom of a corresponding pouch formed by the machine. More particularly, each cup is initially formed as a gusset, the cross-section of which is W-shaped, and the shape is maintained by heat sealing and chilling operations.

The open edge of the envelope opposite to each cup receives a fitment that is spot sealed to the envelope. A further heat sealing operation closes the open edge of the envelope around the fitment to form a top seal of the corresponding pouch and to attach the fitment permanently.

End sealer/cut-off assemblies provide a transverse end seal at the bottom of the envelope, and release each completed pouch from the envelope. The end seal simultaneously seals abutting side edges of a leading pouch and a next pouch being formed. The leading pouch has just been filled, and the next pouch is about to be filled. The sealing of a side edge of the next pouch provides a receptacle into which a predetermined quantity of liquid is dispensed by opening a valve at the bottom of the fill tube. Just before each end seal is formed, deflater plates engage the envelope from opposite sides, to flatten the envelope and control the residual air volume in the filled pouch. A cut-off knife bisects each end seal to separate the filled leading pouch from the envelope.

In the preferred embodiment, the envelope is formed by a folder (forming plow) at the top of the machine. The folder folds in half a web of thermoplastic film supplied from a film roll. The film roll is adjustably braked in accordance with the amount of film on the roll to provide constant drag as film is pulled from the film roll by an auxiliary film drive assembly. A film path from the film roll to the folder is defined by a series of idler rollers, and by rollers of a dancing bar that moves in response to changes in film tension. The auxiliary film drive assembly has rollers that pinch the web therebetween at a position along the film path between the film roll and the dancing bar. The speed of the auxiliary film drive is responsive to movement of the dancing bar to maintain constant film tension.

At a position along the film path between the dancing bar and the folder, the film is wrapped about a brake roller. When power is applied to the machine, but the film is not moving, the brake roller is locked to isolate the portion of the film path leading from the brake roller to the folder.

BRIEF DESCRIPTION OF THE DRAWINGS

The invention will be further described in conjunction with the accompanying drawings, wherein:

FIG. 6 is a partially exploded perspective view showing cup sealer and chiller assemblies, and a plate employed in gusset forming;

FIG. 7 is a perspective view showing a heated cup seal bar;

FIG. 10 is a perspective view showing a nip sealer assembly;

FIG. 10A is a perspective view of a nip seal bar;

DETAILED DESCRIPTION OF THE INVENTION

Figure 1:
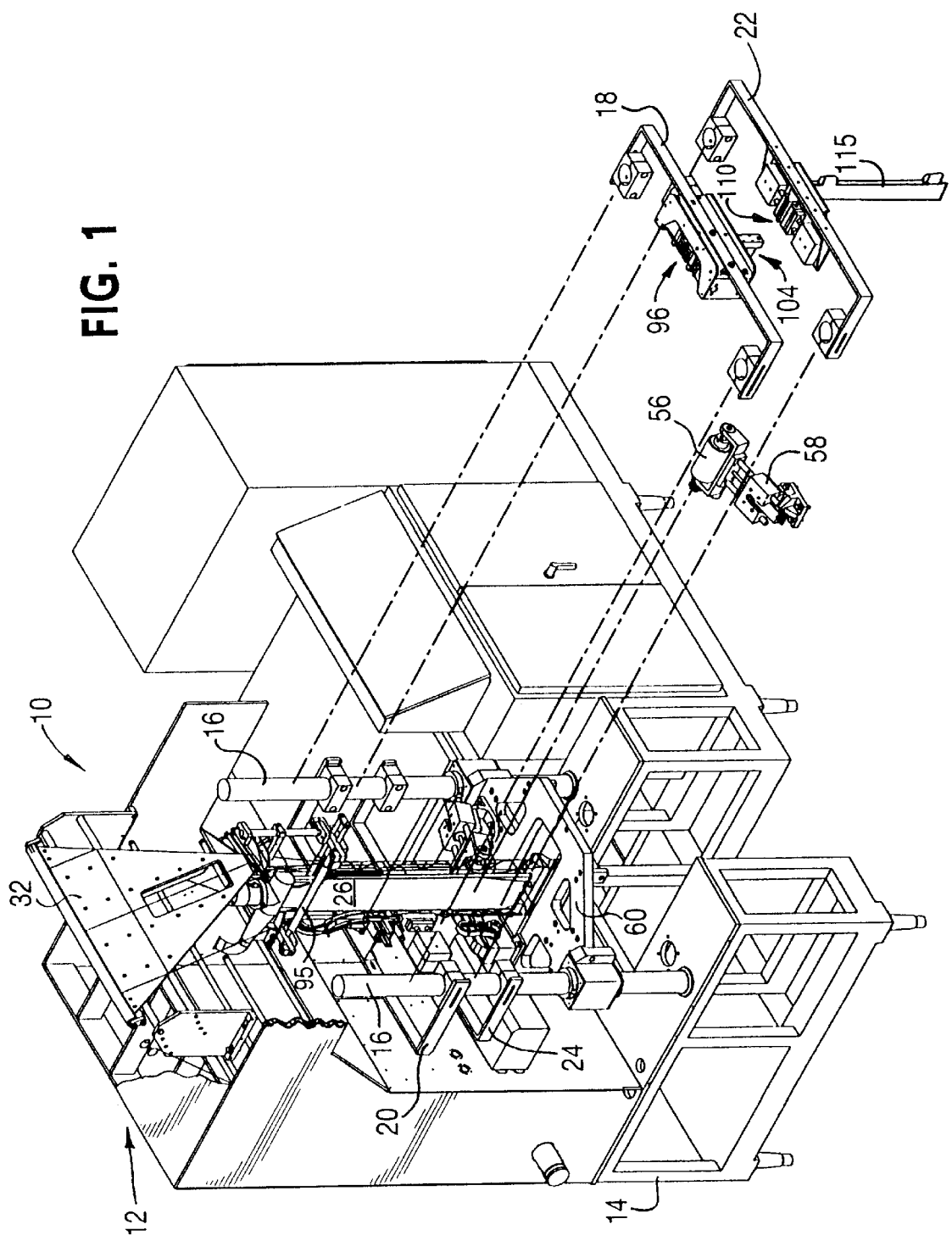
FIG. 1 is a partially exploded perspective view of a preferred embodiment of a vertical F/F/S machine of the invention, with a portion of a frame partially broken away to expose features of the invention.

As shown in FIG. 1, a preferred embodiment of a vertical form, fill, seal machine 10 of the invention comprises a main frame 12 having a cabinet 14 and a pair of vertical columns 16. The cabinet 14 has walls that embrace and partially enclose components of the machine. Some of the main components are mounted on the columns 16 by cross-bars 18, 20, 22, 24. See FIGS. 1 and 2. The tops of the columns 16 are attached to a horizontal wall (not shown) of the frame 12. Central to the machine is a flat, wide, vertical fill tube 26 surrounded by an envelope 28 of thermoplastic film (see FIG. 3) from which a series of stand-up pouches P (see FIGS. 29A–29E) are formed, filled, and sealed.

Figure 2:
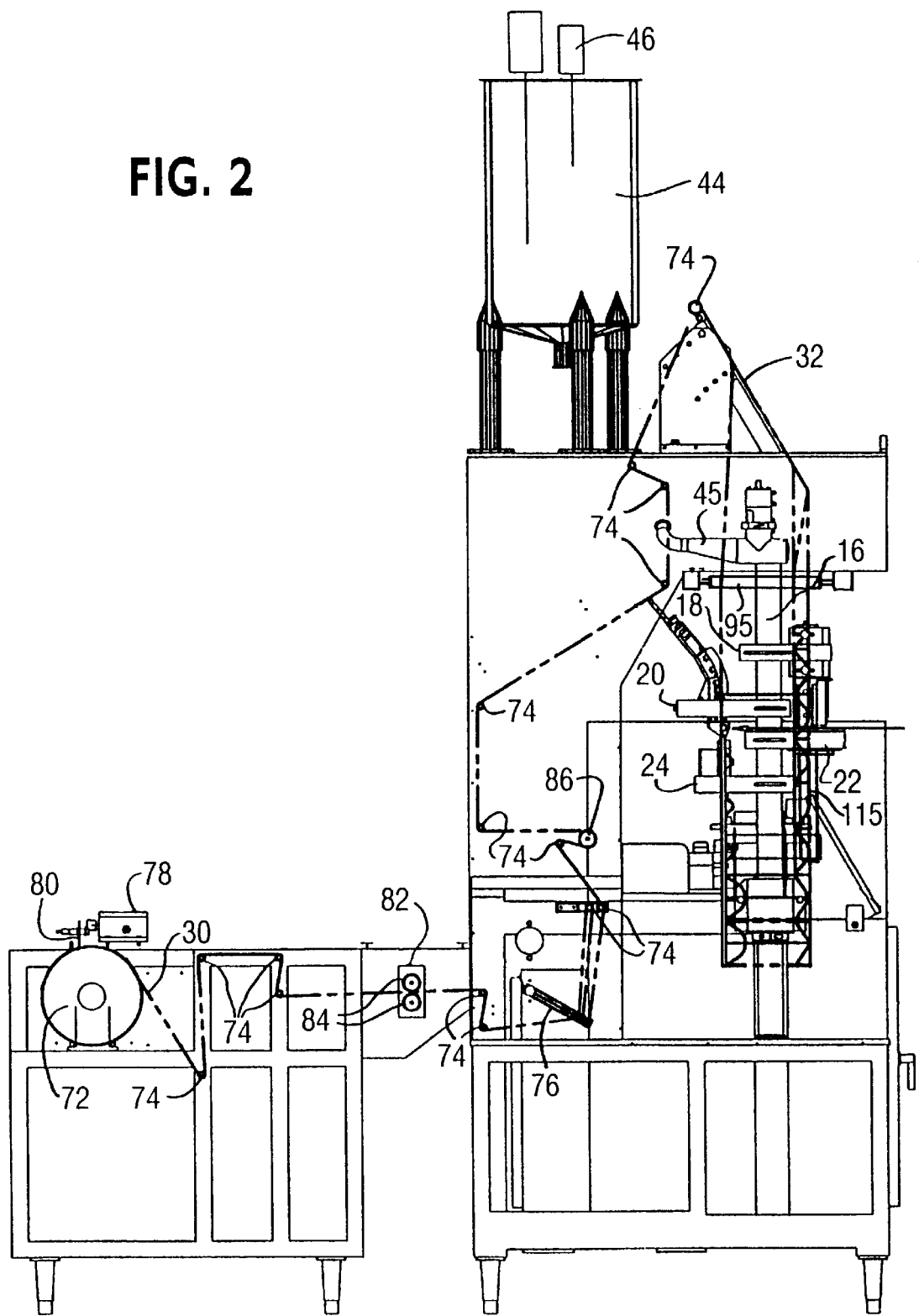
FIG. 2 is a diagrammatic side elevation view showing the film path in the preferred embodiment.
Figure 3:
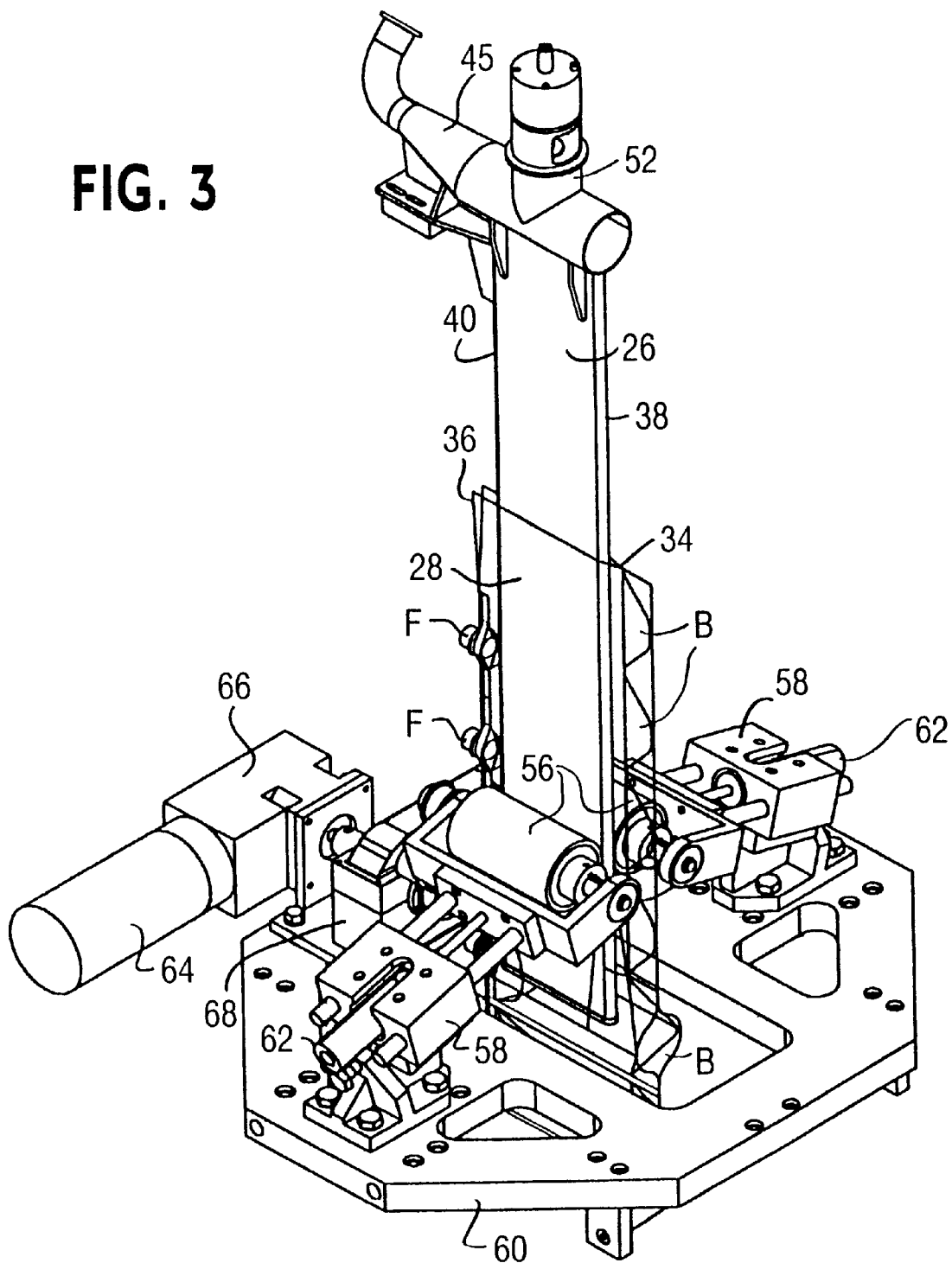
FIG. 3 is a perspective view showing a fill tube, a film envelope, and a main drive assembly.

As shown in FIGS. 1–3, in the preferred embodiment a web 30 of thermoplastic film is supplied to a folder 32 (forming plow) at the top of the machine and is folded in half to provide an envelope 28 composed of two film layers, between which the fill tube 26 extends longitudinally. Due to the folding, the envelope 28 has a closed longitudinal edge 34 and an open longitudinal edge 36 adjacent to respective longitudinal edges 38 and 40 of the fill tube.

The fill tube extends transversely throughout a major portion of the width of the envelope (preferably most of the width), to provide substantial support and form for the envelope. The upper end of the fill tube 26 extends through a hole in the above-mentioned horizontal wall of the frame 12 and is attached to the upper surface of the horizontal wall so that the fill tube is suspended from the frame. The envelope 28 passes through the same hole in the horizontal wall.

Figure 4:
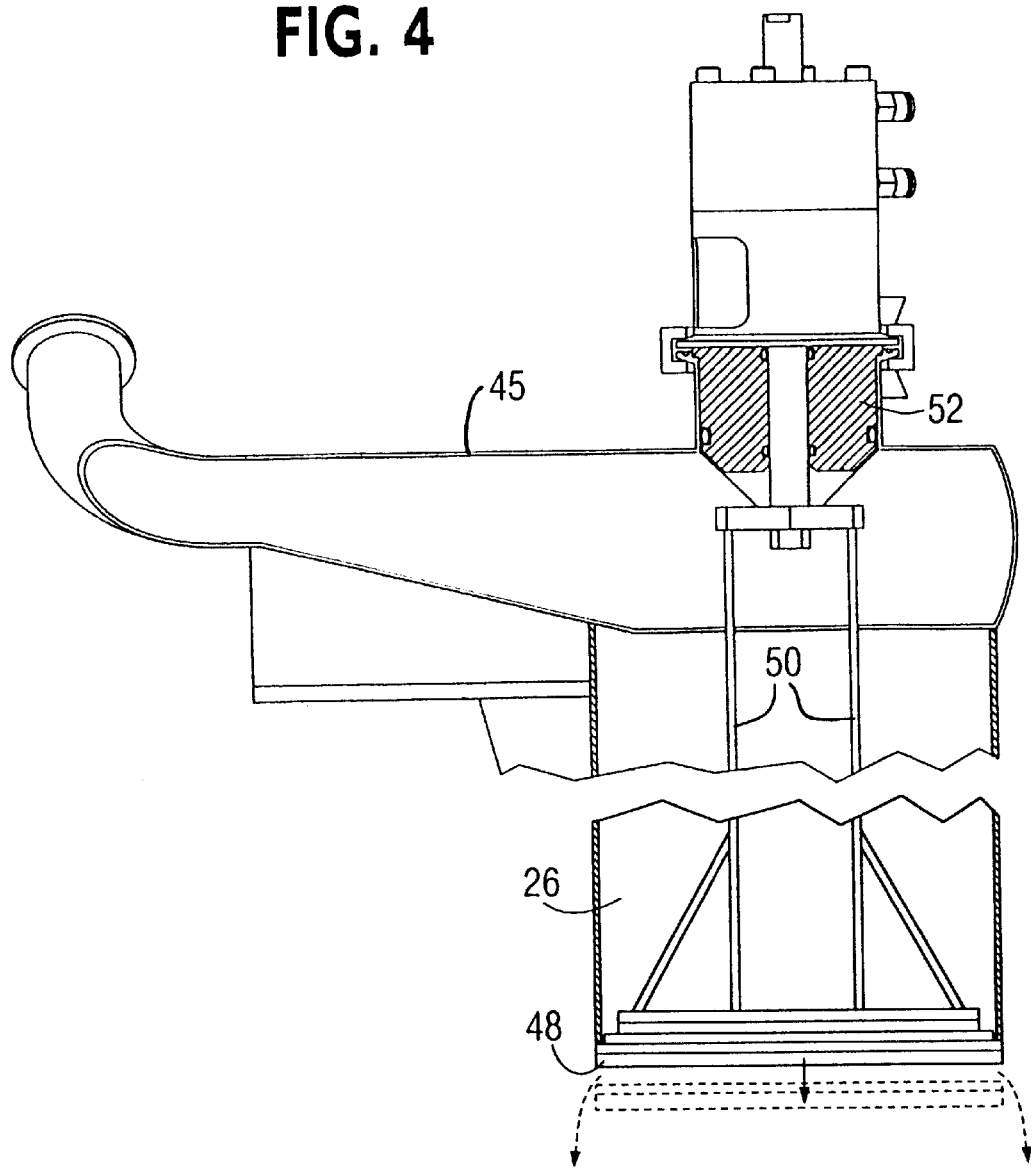
FIG. 4 is a contracted vertical sectional view illustrating a valve and valve actuator of the fill tube.

As shown in FIG. 2, a product tank 44 mounted at the top of the machine contains a product that is supplied by gravity feed to an upper portion of the fill tube via an inlet pipe 45. The product may be supplied to the tank from an external source (not shown), and a product level control 46 may be provided to maintain a desired level of product in the tank. The product is dispensed from the lower end of the fill tube by means of a valve 48 (FIG. 4) that is opened and closed intermittently. In the preferred embodiment, the valve 48 comprises a piston that opens and closes the bottom of the fill tube by means of rods 50 that extend vertically within the fill tube and that are connected to a pneumatically operated actuator 52 at the top of the fill tube.

Figure 5:
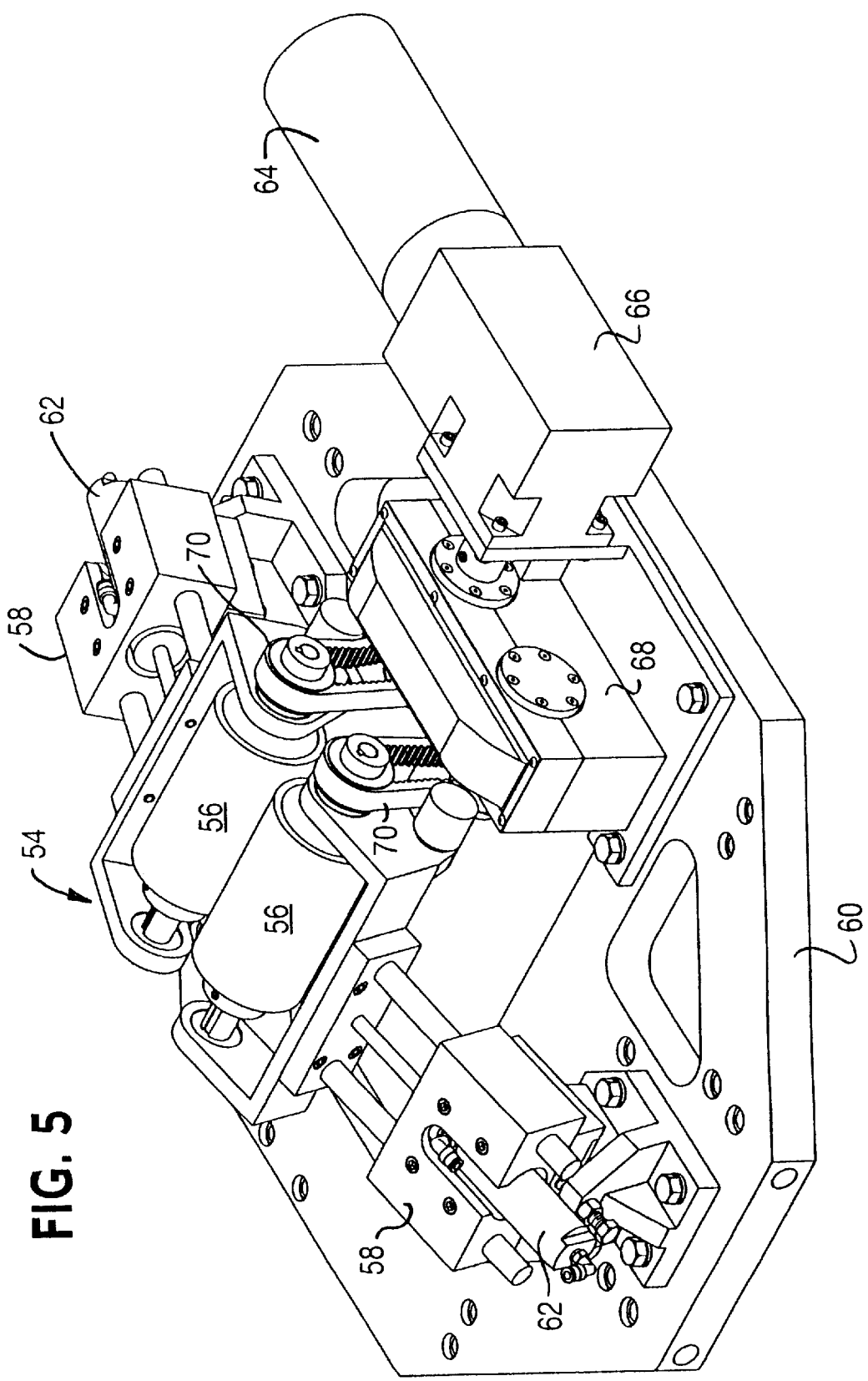
FIG. 5 is a perspective view of the main drive assembly.

As shown in FIGS. 3 and 5, a main drive assembly 54 comprises a pair of drive members in the form of rubber drive rollers 56 that press opposite sides of the envelope 28 against the fill tube 26 and that rotate to move the envelope downwardly along the fill tube step-wise, each step corresponding to one pouch pitch. Other types of drive members, such as drive belts, may be used. The drive rollers 56 are mounted on thrusters 58, that in turn are mounted on a jaw frame 60 supported on the columns 16. In the form shown, the thrusters comprise pneumatic cylinders 62 that are actuated to press the drive rollers against the envelope at opposite sides of the fill tube. The main drive assembly also comprises a stepping motor 64 that is servo-controlled and that turns the drive rollers intermittently via a drive train 66 including a gear box 68 and sprocket and timing belt assemblies 70.

As shown in FIG. 2, in the preferred embodiment the web 30 of thermoplastic film is supplied from a film roll 72 to the folder 32 along a film path defined by series of idler rollers 74 and rollers of a dancing bar 76. The film roll has a brake/tension system 78 that maintains a constant drag on the film roll as the diameter of the film roll decreases. The brake/tension system 78 includes a roll follower 80 that controls voltage applied to a magnetic particle brake (not shown) at one end of the film roll 72. The dancing bar 76 is pivotally mounted on the frame 12 and moves in response to changes in film tension.

The dancing bar controls an auxiliary film drive assembly 82 disposed along the film path between the film roll 72 and the dancing bar. The auxiliary film drive assembly comprises a pair of rubber rollers 84 that pinch the web 30 between the rollers. Rollers 84 are driven by a motor (not shown) and pull the web 30 off of the film roll 72. Pivotal movement of the dancing bar 76 varies a potentiometer (not shown) that controls the voltage applied to the motor of the auxiliary drive assembly 82, and thus the speed of the motor and the auxiliary film drive rollers. The speed of the motor decreases as the dancing bar moves downward and increases as the dancing bar moves upward. This arrangement, in combination with the constant drag on the film roll, maintains constant web tension.

At a position on the film path between the dancing bar 76 and the folder 32, the web is wound about a film brake roller 86. When power is supplied to the machine but the film is not moving, the film brake roller is locked to isolate the portion of the film path that extends beyond the film brake roller. When the film is moving, the film brake roller rotates freely. The film brake roller is controlled by a solenoid-driven clutch brake (not shown).

In the preferred embodiment, the manufacture of each product-filled self-supporting pouch P (see FIG. 29A) involves forming a stand-up base B at the bottom B1 of the pouch, providing seals at the bottom B1, inserting a fitment F and sealing the top T of the pouch, sealing a side edge S1 of the pouch, dispensing a predetermined quantity of product into the pouch through the opposite side edge S2, sealing side edge S2, and detaching the pouch from the continuous web envelope.

Figure 20:
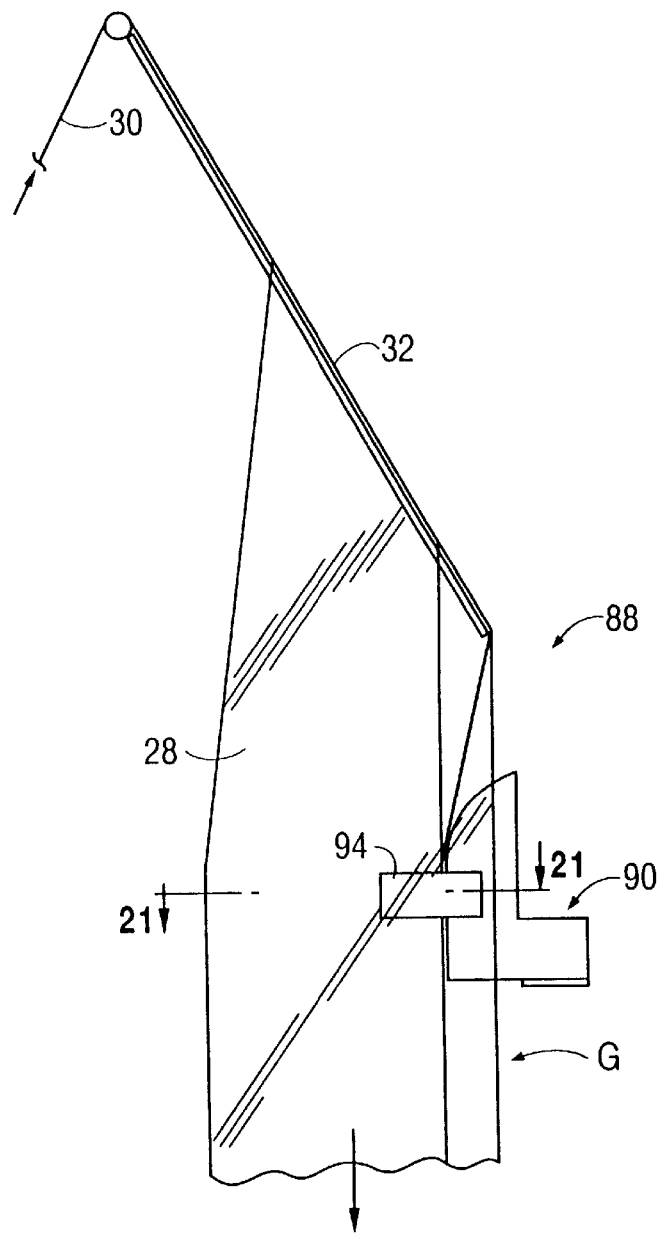
FIG. 20 is a fragmentary side elevation view showing gusset shaping.
Figure 21:
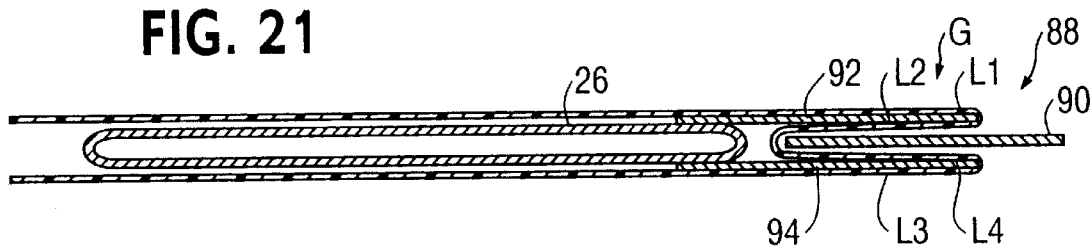
FIG. 21 is an enlarged sectional view taken along line 21—21 in FIG. 20.

In the preferred embodiment, each stand-up base B is formed by a base-former assembly that performs shaping and sealing operations. As shown in FIGS. 20 and 21, a progressive shaper 88 mounted below the folder 32 comprises three guide plates 90, 92, 94 that transform a portion of the film envelope adjacent to the closed edge 34 into a gusset G that is W-shaped in cross-section and that becomes a base cup B. For somewhat similar base cups see U.S. Pat. No. 3,380,646, incorporated herein by reference. Plate 90 is mounted on top of the cup sealer assembly 96 (FIG. 6). Plates 92 and 94 are attached to the fill tube 26.

Figure 28:
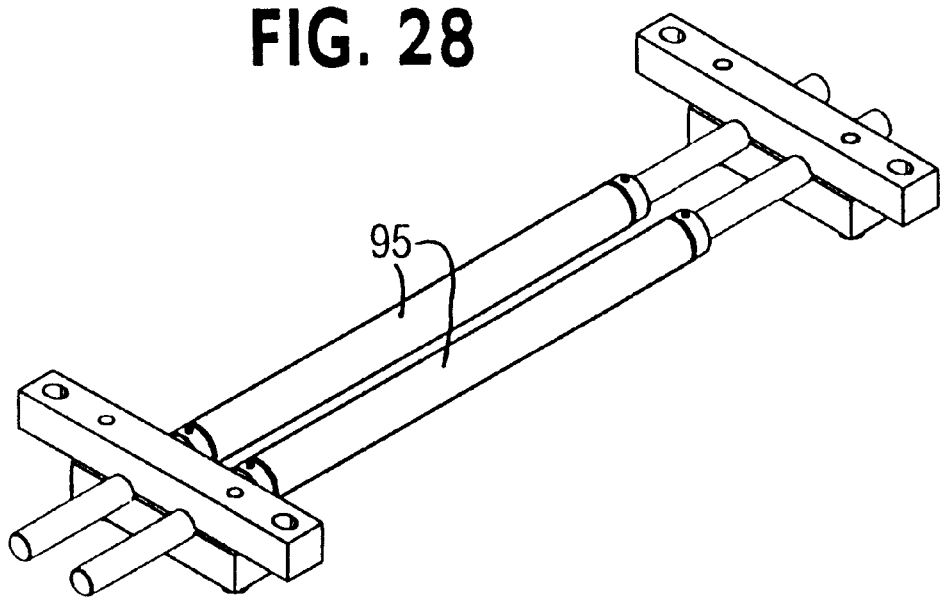
FIG. 28 is a perspective view of creaser rollers.
Figure 29A:
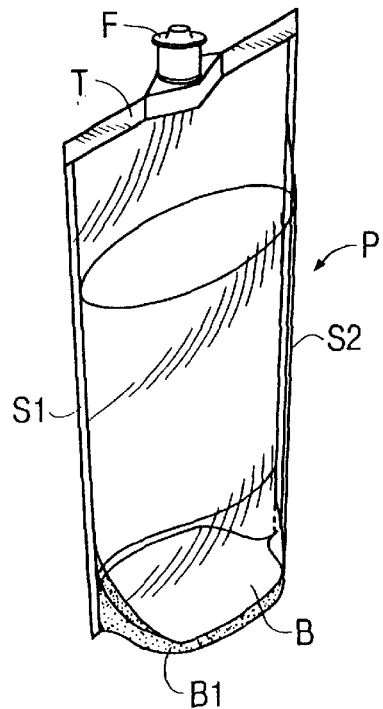
FIGS. 29A–29E are perspective views of pouches produced by the invention.
Figure 29B:
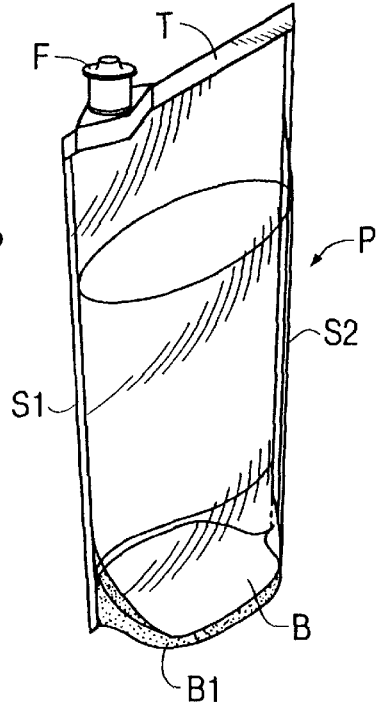
Figure 29C:
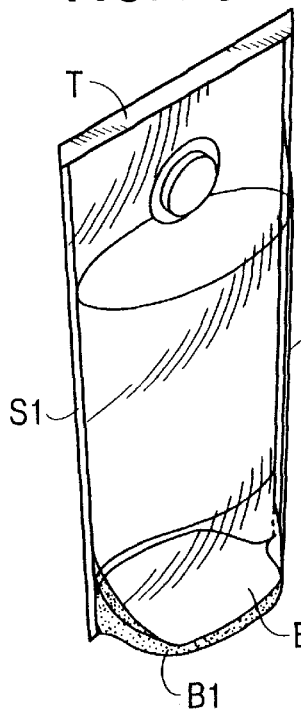
Figure 29D:
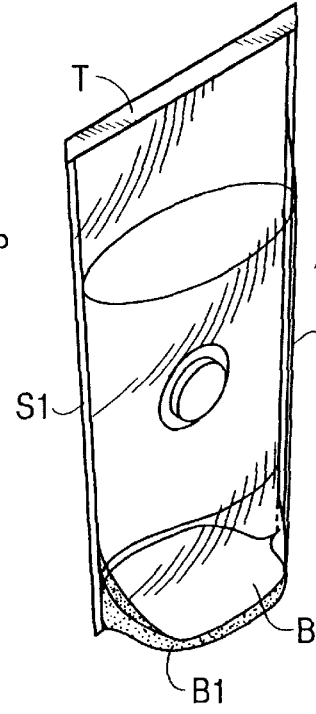
Figure 29E:
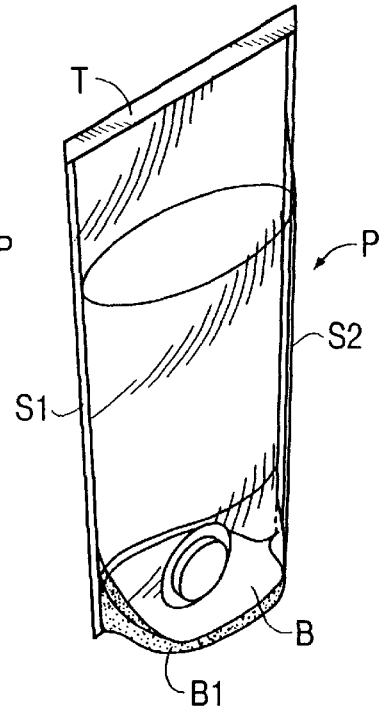

Each gusset G includes two pairs of film layers L1, L2 and L3, L4, each of which is V-shaped in cross-section. See FIG. 21. Creaser rollers 95 (FIGS. 1, 2, and 28) are mounted on the lower surface of the above-mentioned horizontal wall of the frame 12 at opposite sides of the film envelope 28 and are used to maintain the configuration of the gusset. As each gusset is shaped, the drive rollers 56 advance the envelope 28 to bring the gusset to a cup sealer assembly 96.

As shown in FIG. 6, the cup sealer assembly 96, which is mounted on the cross bar 18 below the progressive shaper 88, comprises a pair of opposed pneumatically reciprocated heated seal bars 98 (see FIG. 7) that engage respective pairs of film layers at opposite sides of a separator plate 100, to heat seal the film layers L1, L2 and L3, L4 of each pair to one another separately from the layers of the other pair. The left and right seal bars 98 are mirror images of one another. Each seal bar 98 is mounted on a pneumatic cylinder 102. In FIG. 6, the cup sealer assembly is shown reversed from the position shown in FIG. 1.

Figure 22:
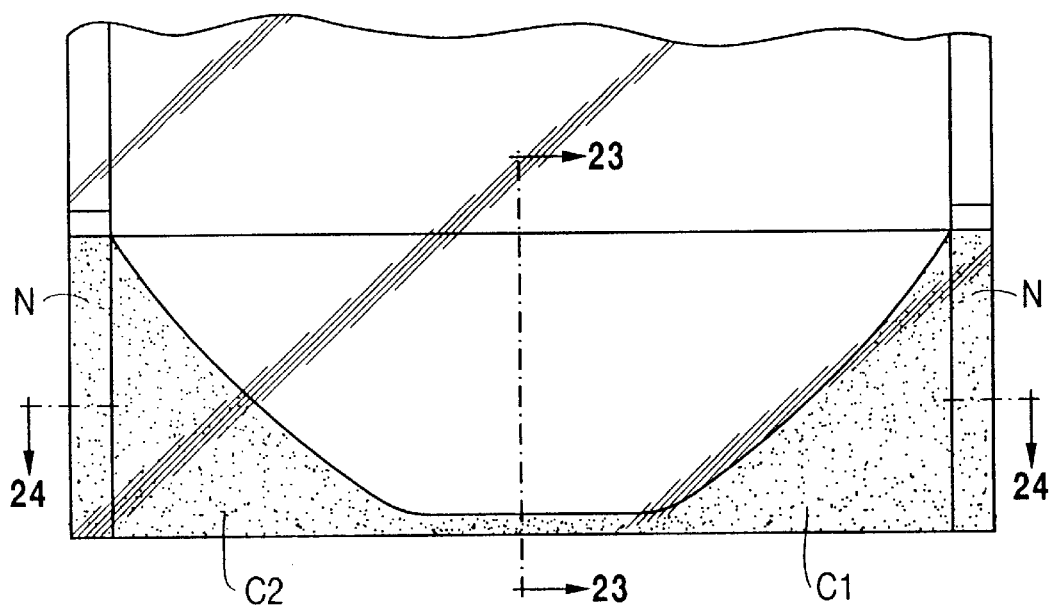
FIG. 22 is a fragmentary plan view showing a base of a pouch.
Figure 23:
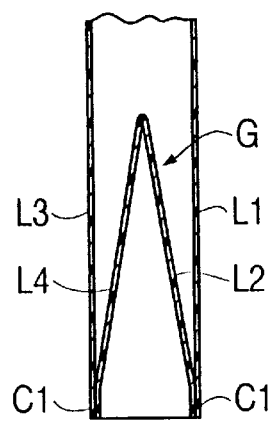
FIG. 23 is a sectional view taken along line 23—23 in FIG. 22.

The cup sealing operation comprises two steps. In a first step, the seal bars 98 approach the separator plate 100 to apply a first curved seal portion C1 that is formed by the upper half of the seal bars on respective sides of the separator plate. See FIGS. 22 and 23. Then, in a second step, after the envelope is advanced by one pouch pitch, the seal bars 98 approach the separator plate 100 again to apply a second curved seal portion C2 that is formed on the same pouch by the lower half of the seal bars on respective sides of the separator plate. (At the same time, curved seal portions are formed by the upper half of the seal bars on a next pouch.) On each side of a pouch being formed, the two curved seal portions C1 and C2 join and overlap slightly to provide a cup seal.

Figure 8:
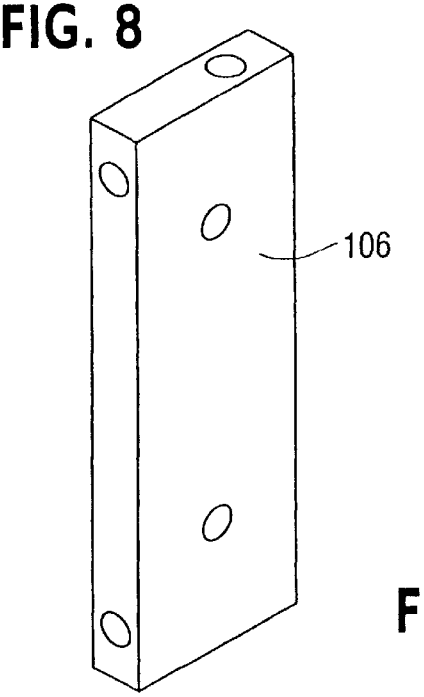
FIG. 8 is a perspective view showing a cooled cup chill bar.
Figure 9:
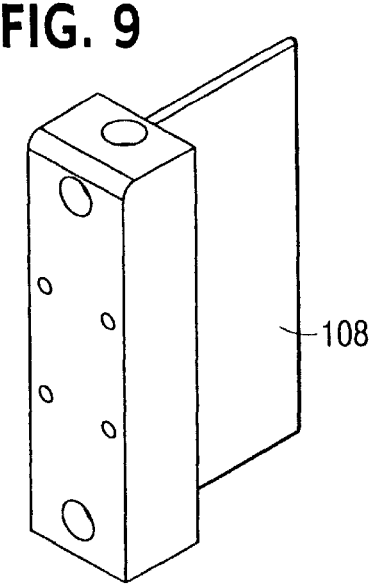
FIG. 9 is a perspective view showing a cooled cup chill separator plate.
Figure 12:
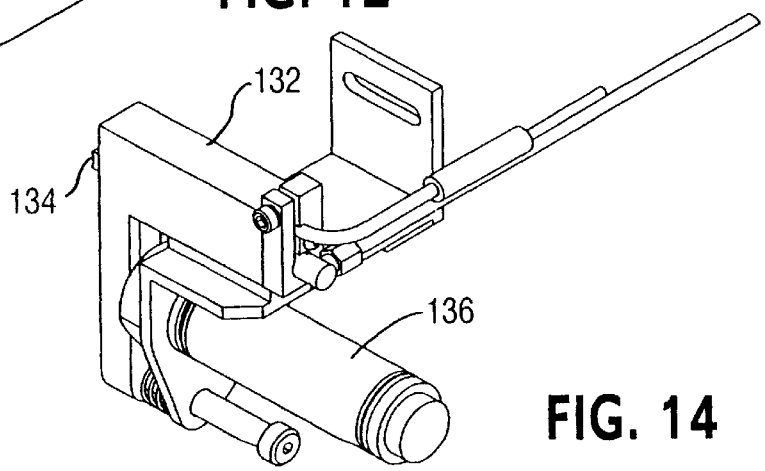
FIG. 12 is a perspective view showing a spot sealer.
Figure 13:
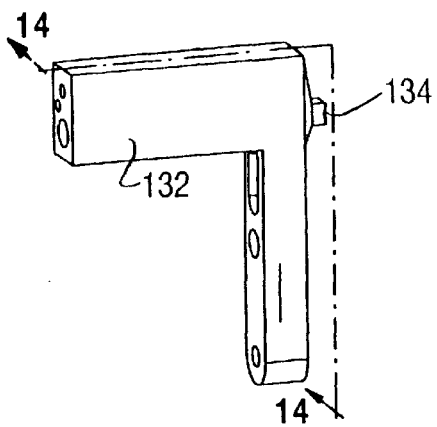
FIG. 13 is a perspective view showing a spot seal bar.
Figure 14:
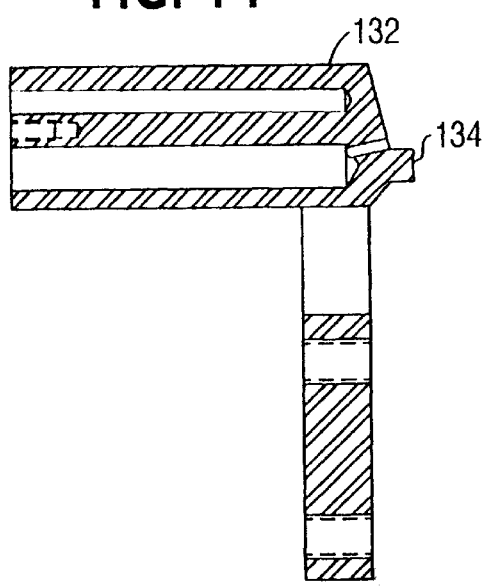
FIG. 14 is a vertical sectional view of the spot seal bar, taken along line 14—14 in FIG. 13.

After each cup seal portion is formed, the drive rollers advance the envelope to a cup seal chiller assembly 104. The cup seal chiller assembly is mounted just below the cup sealer assembly and comprises opposed pneumatically reciprocated cooled chill bars 106 (one of which is shown in FIG. 8) that engage the sealed layers at opposite sides of a cooled center chill bar 108 (FIG. 9) to chill and stabilize the cup seals. The chill bars 106 are mirror images of one another and are suspended from the structure that supports and moves the seal bars 98. The chill bars 106 first engage and chill the first cup seal portion of a pouch. Then, when the envelope is advanced again by one step, the chill bars engage and chill the second cup seal portion of the pouch.

The heated seal bars, and other heated parts of the machine, are heated by internal electrical heaters inserted in bores of the heated parts. In the preferred embodiment, the heaters provide continuous heat. Internal heat sensors, also inserted in bores in the heated parts, are components of a temperature control system (not shown) that maintains constant temperatures of the heated parts. Chilling is provided by cooling water circulated through bores of cooled parts. The cooling water is supplied from a chiller, and the temperature of the water is controlled to maintain a desired level.

Figure 24:
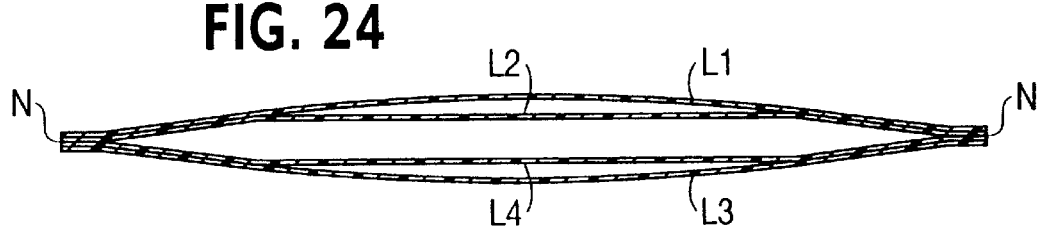
FIG. 24 is a sectional view taken along line 24—24 in FIG. 22.
Figure 25:
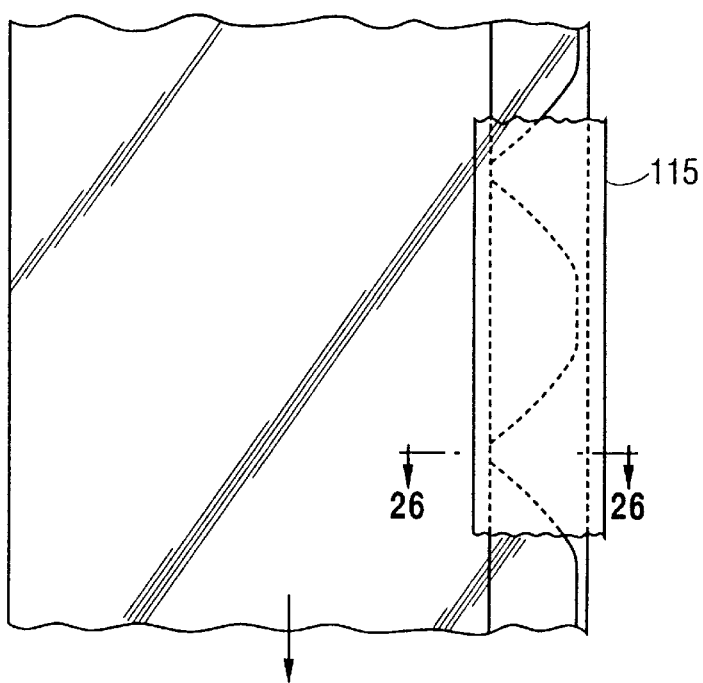
FIG. 25 is a fragmentary side elevation view showing a fold guide and a portion of an envelope after nip sealing.
Figure 26:
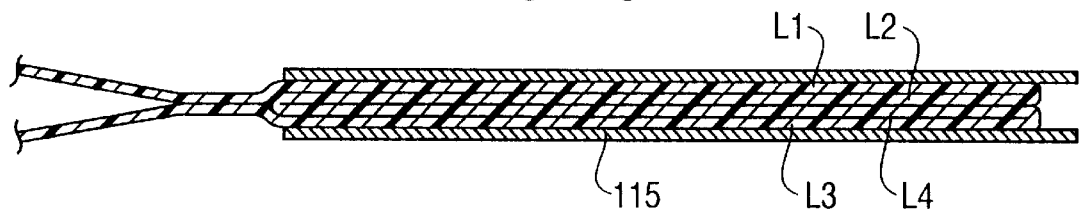
FIG. 26 is an enlarged sectional view taken along line 26—26 in FIG. 25.
Figure 27:
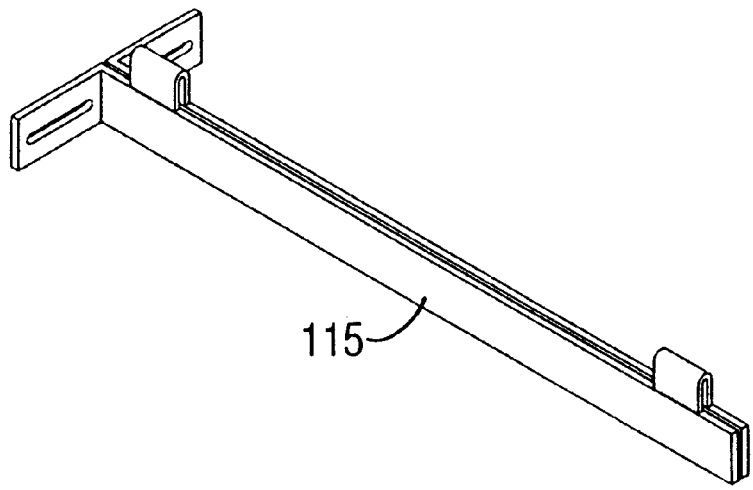
FIG. 27 is a perspective view of the fold guide.

After cup seal chilling, the drive rollers 56 advance the envelope 28 to align abutting ends of successive cups with a nip sealer assembly 110, which is employed to ensure against leakage at critical side edges of each cup. As shown in FIG. 10 (reversed from FIG. 1), the nip sealer assembly, which is mounted on cross bar 22 below the cup seal chiller assembly 104, comprises a pneumatically reciprocated heated seal bar 112 (see FIG. 10A) and an opposed pneumatically reciprocated backing plate 114. When the seal bar 112 and the backing plate 114 are pressed against opposite sides of the envelope, they apply a nip seal N to the abutting ends of adjacent cups. See FIGS. 22 and 24. In two sealing steps, all four layers L1, L2, L3, L4 of each cup are sealed to each other along opposite ends of each cup. The nip seals N extend slightly beyond the four layers (toward the top of the pouch being formed) to seal to one another the two layers at opposite side edges of each pouch adjacent to the ends of its cup. A fold guide in the form of a channel 115 suspended from the nip sealer assembly embraces a length of the film envelope to maintain the flatness of the envelope after nip sealing. See FIGS. 1, 2, and 25–27.

Figure 11:
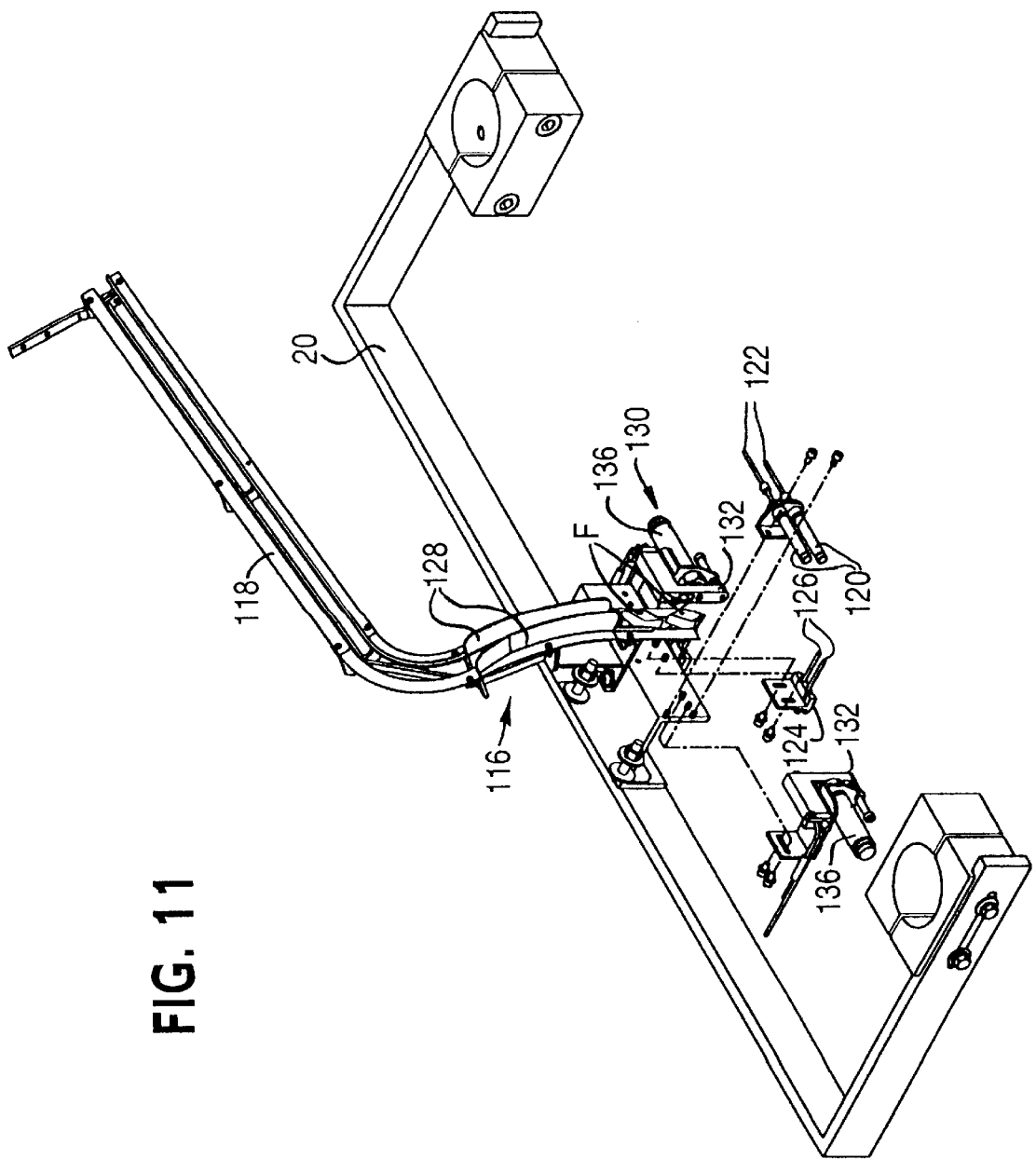
FIG. 11 is a partially exploded perspective view showing a fitment supply assembly and a spot sealer assembly.

As shown in FIG. 11, a fitment supply assembly 116 supplies fitments F one after another (seriatim) to a fitment insertion location at which each fitment is received between the film layers at the open longitudinal edge of the envelope (i.e., at the top of each pouch being formed) opposite to the cup at the bottom of each pouch being formed. The fitment supply assembly is mounted on cross bar 20 and includes a track 118 along which fitments are moved by gravity from a fitment supply (not shown) at an upper end of the track. The fitment supply may include a vibratory feeder to move fitments onto the track with uniform orientation.

At the bottom of the track, a dual piston escapement 120 extends and retracts a pair of rods 122 alternately, to allow a fitment at the bottom of the track to drop onto a spring-biased locator 124 and to hold back the next fitment on the track. The locator comprises a pair of rods 126 which embrace a fitment thereon. The two layers of the envelope at the open longitudinal edge are separated by spacer plates 128 so that they embrace the fitment on the locator 124.

As shown in FIG. 11, a spot sealer assembly 130 is also mounted on cross bar 20. The spot sealer assembly comprises opposed pneumatically reciprocated heated spot seal bars 132 (see FIGS. 11–14). The spot seal bars have protuberances 134 which are shaped to complement the configuration of adjacent surfaces of each fitment. The spot seal bars are mounted on pneumatic cylinders 136 which move the spot seal bars into engagement with the film at opposite sides of the fitment on the locator 124, thereby spot sealing the fitment to the envelope.

Figure 15:
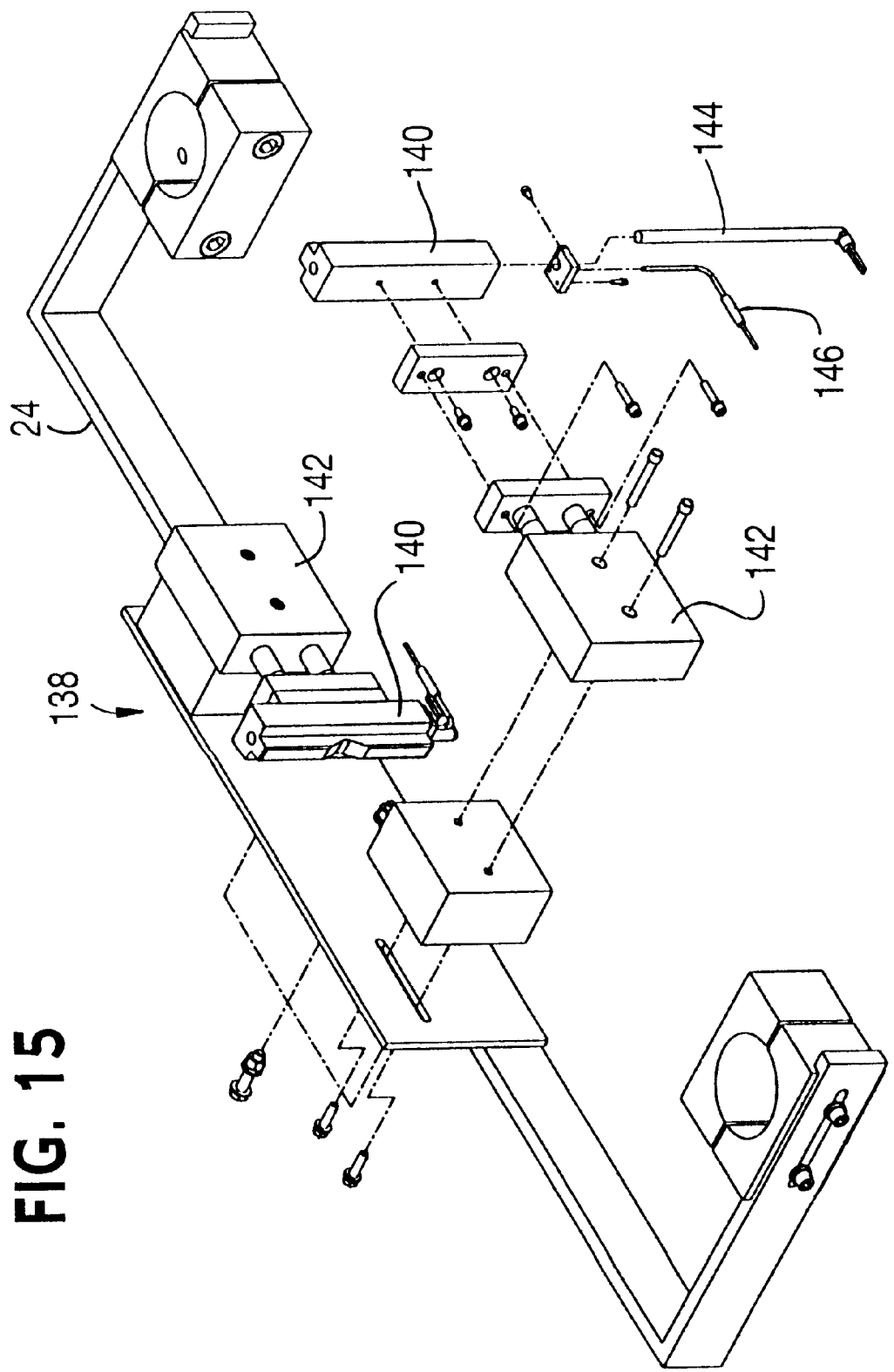
FIG. 15 is a partially exploded perspective view showing a fitment/top sealer assembly.
Figure 17:
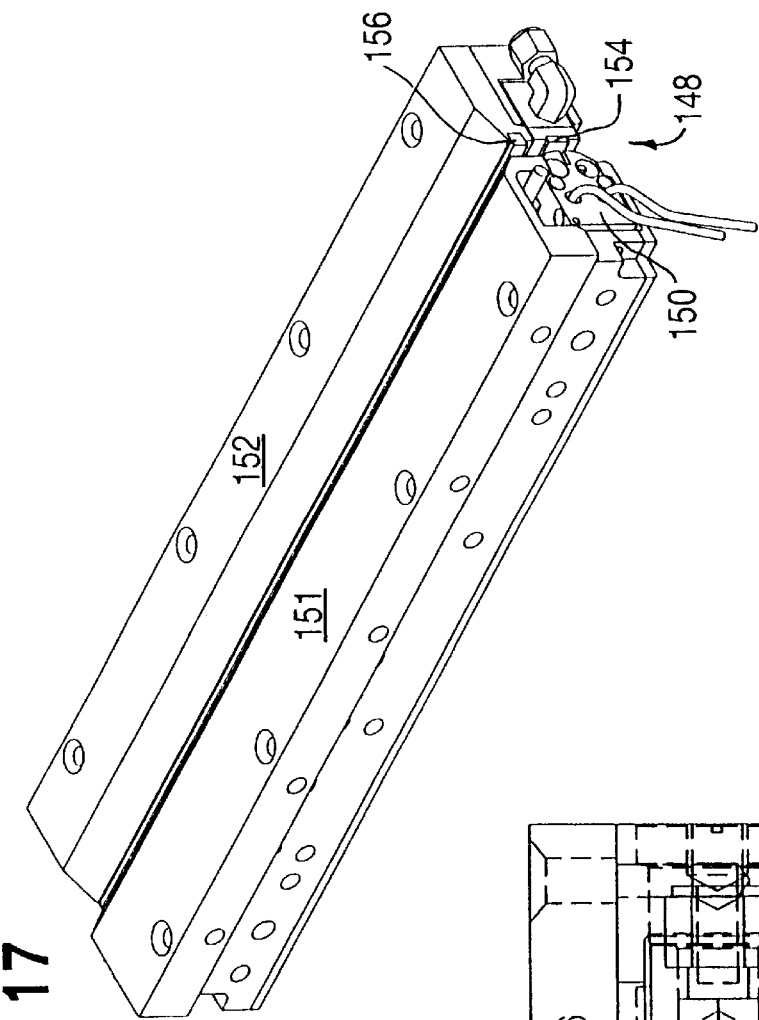
FIG. 17 is a perspective view of the end sealer and cut-off assemblies.
Figure 16:
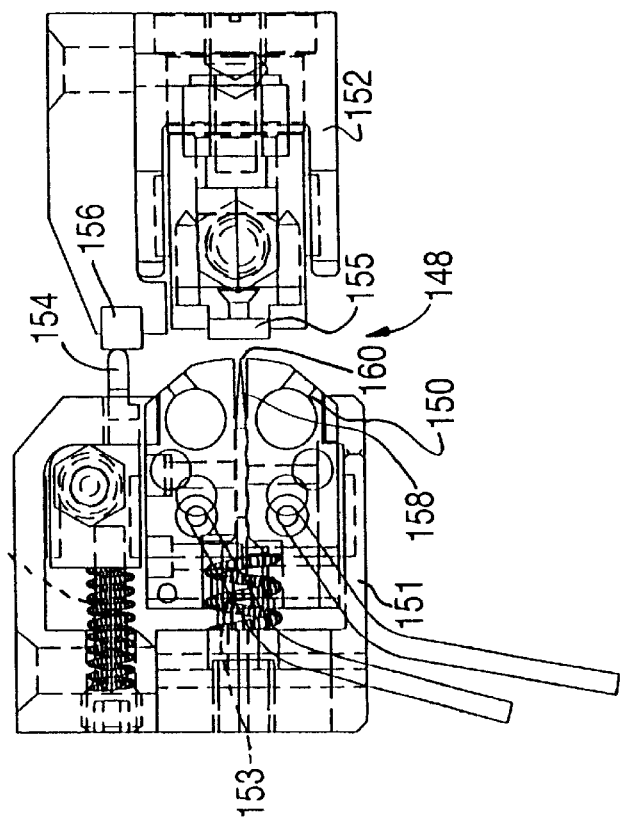
FIG. 16 is an end view of end sealer and cut-off assemblies.
Figure 18:
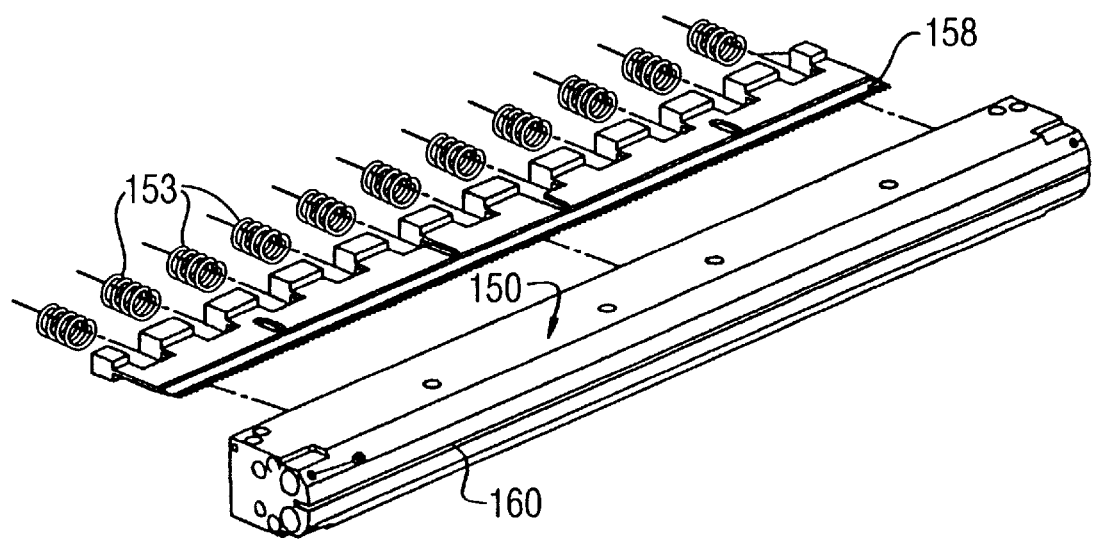
FIG. 18 is an exploded perspective view of a portion of the end sealer and cut-off assemblies.

After a fitment is spot sealed to the envelope, the drive rollers advance the envelope to a fitment/top sealer assembly 138, shown in FIG. 15. The locator 124 moves on an arc, against its spring bias, so that the rods 126 turn downwardly to release the fitment thereon. Alternatively, the locator may be retracted away from the spot sealing position, by using a pneumatic cylinder, for example.

The fitment/top sealer assembly 138 comprises a pair of opposed pneumatically reciprocated heated seal bars 140 that engage the envelope from opposite sides. Each seal bar is shaped to complement the shape of the adjacent surface of a fitment and to extend along a length of the envelope corresponding to the top of a pouch being formed (and slightly beyond). The seal bars 140 are actuated by pneumatic cylinders 142 mounted on the cross bar 24. A typical heater 144 and temperature sensor 146 are shown in FIG. 15. By virtue of the fitment/top sealer assembly, each fitment is permanently attached to its corresponding pouch and the top of the pouch is permanently sealed around the fitment.

After the top seal is applied, the drive rollers advance the envelope to end sealer/cut-off assemblies 148 that form an end seal extending completely across the envelope and that bisect the end seal to release a filled and sealed pouch from the machine. See FIGS. 16–19. The end sealer/cut-off assemblies are mounted below the jaw frame 60. Each end seal simultaneously seals a trailing side edge of a leading pouch being formed and a leading side edge of the next pouch being formed.

The end sealer assembly comprises a heated seal bar 150 extending transversely of the envelope at one side, and a cooled backup bar 152 extending transversely of the envelope at the opposite side. The heated seal bar has an associated cooled gripper bar 154 extending transversely of the envelope. The cooled backup bar 152 has two backup plates 155 and 156 extending transversely of the envelope and cooperating with the heated seal bar 150 and the cooled gripper bar 154, respectively. A cut-off knife 158 is mounted in a slot 160 of the seal bar 150.

Figure 19:
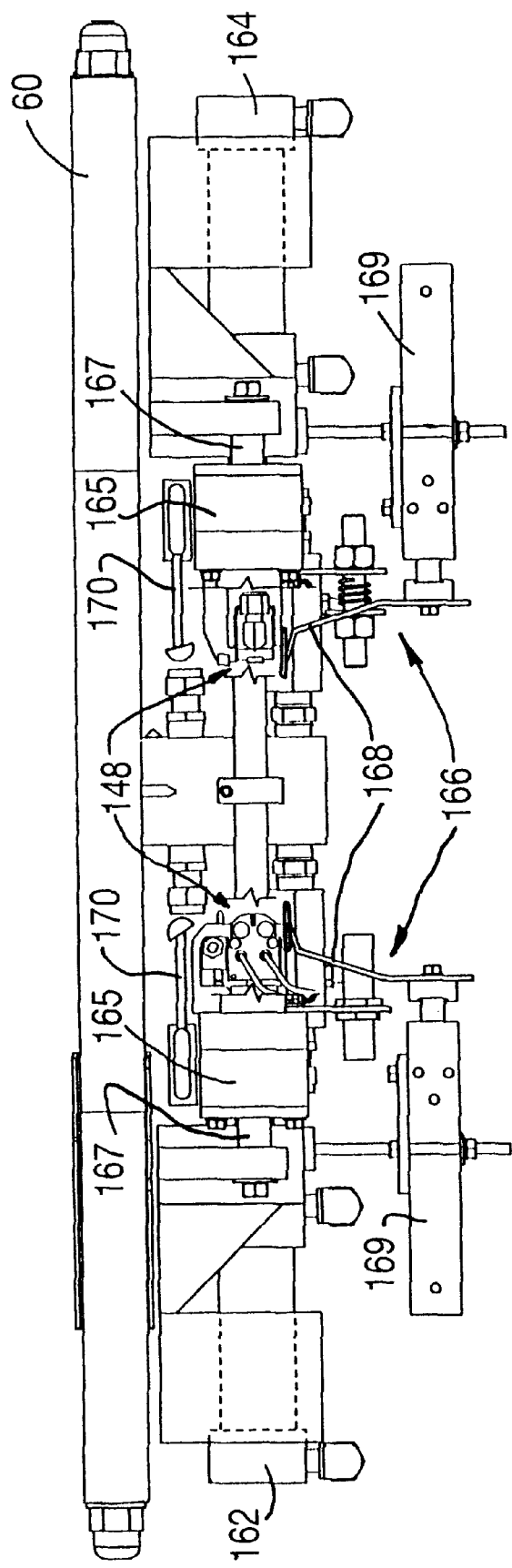
FIG. 19 is a front elevation view of the end sealer and cut-off assemblies, and a deflater assembly.

Referring to FIG. 19, the heated seal bar 150 (with its gripper bar 154) and the cooled bar 152 are reciprocated by hydraulic cylinders 162 and 164. The hydraulic cylinders drive the heated seal bar 150 and the cooled bar 152 at the longitudinal center of each bar. The movement of the bars is guided at the ends of the bars by guide members 165 sliding on horizontal guide rods 167 mounted below the jaw frame 60.

Figure 19A:
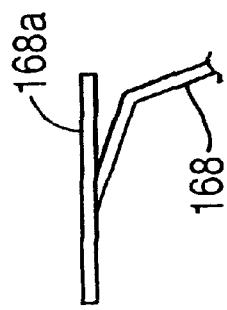
FIG. 19A is a fragmentary side elevation view showing a deflater plate.

Mounted below the end sealer/cut-off assemblies 148 is a deflater assembly 166 reciprocated by pneumatic cylinders 169. The deflater assembly has horizontal deflater plates 168a mounted on arms 168 (see FIG. 19A) and disposed to engage opposite sides of the envelope below the region at which an end seal is formed. Just before the formation of each end seal, the deflater plates engage the envelope from opposite sides to squeeze air from the region at which an end seal is to be formed and to flatten the envelope, thereby to ensure a leak-proof end seal.

When the envelope stops at the end sealer/cut-off position, the heated seal bar 150 and the gripper bar 154 are hydraulically actuated to approach one side of the envelope, while the cooled bar 152 is hydraulically actuated to approach the opposite side of the envelope. Before the envelope is engaged by the heated seal bar 150 and its backup plate 155, the gripper bar 154 and its backup plate 156 squeeze the envelope therebetween, to flatten and stabilize the position of the envelope. Two pairs of horizontally spaced leaf spring fingers 170 may also engage the envelope to stretch the envelope horizontally. See fingers 44 in FIG. 5 of U.S. Pat. No. 4,947,621 mentioned earlier.

The heated seal bar 150 is supported in a casing 151 and is urged toward the backup plate 155 by springs 153. A stop (not shown) limits the outward movement of the heated seal bar 150 in the casing 151. The gripper bar 154 is urged toward the backup plate 156 by springs 157, outward movement of the gripper bar 154 in the casing 151 also being limited by a stop (not shown). When the envelope is engaged by the seal bar 150 and its backup plate 155 an end seal is formed.

The knife 158 is rigidly mounted in the casing 151. When the seal bar 150 engages the envelope backed up by the backup plate 155, the seal bar is then pushed back into the casing 151 to expose the edge of the knife 158 in order to bisect the end seal transversely of the envelope. The deflater plates are retracted away from the envelope as the knife 158 bisects the end seal.

As stated earlier, bisecting of the end seal releases the leading pouch from the machine. The remaining portion of the end seal at the bottom of the envelope forms a side edge seal of the next pouch, so that a receptacle is formed into which a quantity of product is dispensed through the fill tube 26 by opening valve 48. Then, when the envelope is advanced further and another end seal is formed along the opposite side edge of the just-filled pouch, the contents of the pouch are completely enclosed.

The various operations of the machine of the invention are computer controlled and coordinated in a conventional manner. Electrical, pneumatic, hydraulic, chilling, and control components may be housed in the cabinet shown in FIG. 1.

While a preferred embodiment of a vertical F/F/S machine of the invention has been shown and described, changes can be made without departing from the principles and spirit of the invention, the scope of which is defined in the appended claims. For example, the pouch and its base may have configurations different from those disclosed. Pouches may be filled with substances other than liquids. Pouches may be formed without fitments or with fitments located at a position on a pouch differing from that disclosed. See, e.g., FIGS. 29B–29E. Alternative fitment insertion techniques are disclosed, for example, in commonly-owned U.S. Pat. Nos. 3,894,381; 4,452,378; 4,695,337; and 4,779,397, all incorporated herein by reference. Pouches may also be formed and filled (with or without fitments) within the normal operation of an aseptic vertical F/F/S machine, to create sterile packages. Furthermore, pouches may also be formed and filled with product under conditions known as "hot-filling". The film envelope may be formed from two separate webs, rather than from a single folded web. Impulse heating of heated parts may be employed when appropriate. As noted earlier, certain features of the invention have broader utility than in the preferred embodiment, and may be employed in the absence of other features of the invention, under appropriate circumstances.

The invention claimed is:

1. A vertical form, fill, seal machine for producing filled stand-up pouches, comprising:

a vertical fill tube constructed to receive product from a product supply and to dispense a quantity of product from a lower portion of the fill tube;

film supply apparatus constructed to provide a vertical film envelope surrounding the fill tube;

a drive assembly including a pair of drive members disposed at opposite sides of the envelope and constructed to press respective sides of the envelope against the fill tube;

a base-former assembly constructed to transform a portion of the envelope adjacent to a first longitudinal edge thereof into a series of stand-up bases for respective pouches;

a top sealer assembly constructed to provide top seals along portions of a second longitudinal edge of the envelope opposite to corresponding bases;

an end sealer assembly constructed to provide seals at opposite side edges of each pouch being formed, extending between each top seal and a corresponding base, and to entrap a quantity of product dispensed from the fill tube into each pouch being formed; and a cut-off assembly constructed to separate each product-containing pouch from the envelope.

2. A machine according to claim 1, wherein the film supply apparatus is constructed to supply a web of thermoplastic film to an envelope-former at an upper portion of the machine, and the envelope-former is constructed to fold the web longitudinally so as to provide a two-layer vertical film envelope closed along the first longitudinal edge and open along the second longitudinal edge, and wherein the fill tube is flat and extends transversely within the envelope throughout a major portion of the width of the envelope.

3. A machine according to claim 1, wherein the base-former assembly is constructed to form cup-shaped bases from gussets having a substantially W-shaped cross-section, each gusset including two pairs of film layers, and wherein the base-former assembly includes a cup sealer assembly disposed and constructed to heat seal the layers of each pair to one another separately from the layers of the other pair, to form a cup.

4. A machine according to claim 3, wherein the base-former assembly includes a cup seal chiller assembly disposed and constructed to chill the sealed layers of each cup.

5. A machine according to claim 4, wherein the base-former assembly includes a nip sealer assembly disposed and constructed to seal four layers of the envelope to each other along opposite ends of each cup.

6. A machine according to claim 1, further comprising a fitment supply assembly disposed and constructed to insert fitments seriatim into the open longitudinal edge of the envelope at positions aligned with corresponding bases.

7. A machine according to claim 6, further comprising a spot sealer assembly disposed and constructed to thermally spot seal each fitment to the envelope.

8. A machine according to claim 7, wherein the top sealer assembly is constructed to heat seal to one another the two layers of the envelope around each spot sealed fitment along a length of the open longitudinal edge of the envelope corresponding to a top edge of a pouch being formed.

9. A machine according to claim 1, wherein the end sealer assembly is constructed to form, simultaneously, a seal along a side edge of one pouch being formed and an abutting side edge of a next pouch being formed, and wherein the cut-off assembly is constructed to bisect the seal between the abutting side edges.

10. Apparatus according to claim 1, further comprising a deflater assembly disposed and constructed to engage the envelope from opposite sides thereof to deflate and stabilize a portion of the envelope at which each end seal is to be formed.

11. In a method of producing pouches:

supplying a length of film;

folding the film longitudinally to form an envelope surrounding a vertical fill tube such that the envelope has a closed longitudinal edge and an open longitudinal edge; and moving the envelope longitudinally along the fill tube;

wherein fitments are inserted into the open longitudinal edge at positions spaced longitudinally of the envelope and are attached to the envelope.

12. A method according to claim 11, wherein the closed longitudinal edge is formed into a series of stand-up bases at positions corresponding, respectively, to the positions at which the fitments are inserted.

13. A method according to claim 12, wherein the forming of each stand-up base includes forming a gusset progressively along the fill tube as the envelope is moved along the fill tube and sealing portions of the gusset.

14. A method according to claim 13, wherein the sealed portions of the gusset are then chilled by a provided chiller device.

15. A method according to claim 14, wherein other portions of the gusset are then sealed.

16. A method according to claim 11, wherein the film supplied is maintained under substantially constant tension.

* * * * *